Jan. 9, 1962  R. DI PASQUALE ETAL  3,016,413
GRID FOR BATTERY ELECTRODES
Filed Oct. 10, 1958  2 Sheets-Sheet 1

INVENTORS:
RENATO DI PASQUALE
FRANK SOLOMON
BY
AGENT

INVENTORS:
RENATO DI PASQUALE
FRANK SOLOMON
BY
AGENT

United States Patent Office 3,016,413
Patented Jan. 9, 1962

3,016,413
GRID FOR BATTERY ELECTRODES
Renato Di Pasquale, Rutherford, N.J., and Frank Solomon, Lake Success, N.Y., assignors to Yardney International Corp., New York, N.Y., a corporation of New York
Filed Oct. 10, 1958, Ser. No. 766,457
2 Claims. (Cl. 136—45)

The present application relates to battery electrodes and more particularly to supporting and conducting structures for such electrodes.

As the need for greater storage capacity in electrochemical batteries developed, it became the practice in the industry to enlarge the electrodes and to provide supporting grids imbedded in the active material of such electrodes. Subsequently, in batteries designed for still larger capacities and high discharge rates, it was found that the conventional grids, needed to support the greater weights of active material, became objectionably bulky and heavy.

It is an object of this invention to provide a light-weight but deformation-resisting grid of high conductivity capable of supporting the active material of either a positive or a negative battery electrode.

It is a further object of this invention to provide a grid adapted to segregate the particles of active material into local areas, thereby stabilizing the distribution of the active material despite repeated charge-discharge cycling.

Another object is to provide a method for the manufacture of warp-resistant light-weight grids.

Still another object of this invention is the provision of a grid structure that facilitates the access of electrolyte to the active material and provides a highly conductive current-distribution network adapted to be connected to a battery terminal.

It is also an object of this invention to provide a grid-like supporting structure of improved design adapted to be used for purposes not necessarily related to electric batteries or accumulators.

The light-weight grid of this invention comprises a preferably thin-gauge sheet of highly conductive metal, formed into a series of troughs framed by intersecting ribs. The framing ribs provide support in longitudinal as well as transverse direction. The ribs may be formed in any convenient manner, e.g. by embossing or electroforming, and are made preferably from copper, silver, silver-plated copper, or other highly conductive metal or alloy. Advantageously, two such sheets are placed back-to-back in close registry and bonded to each other by fusion, sintering, riveting or other means. The bottom portions of the troughs may be left intact or punched out in various patterns, depending on the degree of conductivity and support required.

Grids of the type described above may be mass-produced by various processes, e.g. by the use of a male die pressing a malleable sheet into a matrix in the form of a resilient rubber pad or the like.

The above and further objects and features of this invention will become more clearly apparent from the following description of certain embodiments, reference being made to the accompanying drawing in which.

Figure 1:
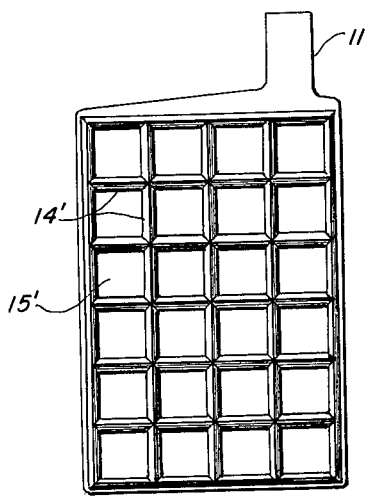
FIG. 1 is a perspective view of an electrode according to one embodiment of this invention.
Figure 2:
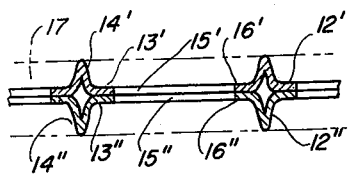
FIG. 2 is an enlarged sectional view taken on section 2—2 of FIG. 1.

According to FIGS. 1 and 2, the light-weight electrode grid is provided with the usual terminal lug 11 and consists of two halves 12', 12". These halves are formed with troughs 13', 13" surrounded by intersecting ribs 14' and 14". The bottoms of the troughs 13', 13" are punched out at 15', 15" to form aligned windows framed by marginal ledge portions 16', 16" wide enough to support a mass 17 of active material subsequently deposited within these troughs, as indicated in dot-dash lines in FIG. 2, and to provide an area of contact for bonding the two halves together by soldering, welding or some other fusion process.

Figure 3:
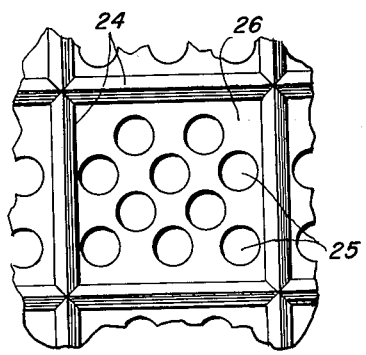
FIG. 3 shows an enlarged view of a further embodiment of the electrode grid according to this invention.

FIG. 3 shows a variant of the grid of FIGS. 1 and 2 wherein the bottoms 26 of the troughs formed by ribs 24 are provided with numerous small perforations 25. This gives improved support to the active material while still affording direct contact between the electrolyte-permeated masses on opposite sides of the grid.

Figure 4:
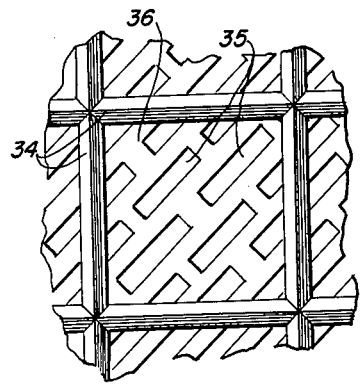
FIG. 4 shows another embodiment of the grid structure of this invention.

FIG. 4 shows another modification of the grid of this invention wherein the depressed portions 36 between ribs 34 are perforated by a series of diagonally extending slots 35. This leads to a further stiffening of the electrode structure in the grid plane and provides additional conductive surface in contact with the active material for high-rate batteries in which the internal resistance of the electrode is an important factor.

Figure 5:
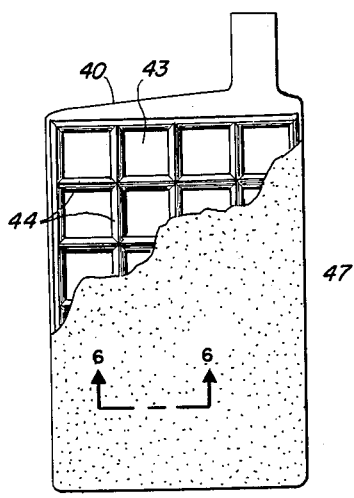
FIG. 5 shows a pasted electrode (parts broken away) incorporating our improved grid.
Figure 6:
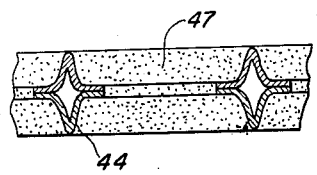
FIG. 6 is an enlarged section taken on line 6—6 of FIG. 5.

FIGS. 5 and 6 show a complete electrode incorporating a grid 40 generally similar to the one shown in FIGS. 1 and 2 but lacking the windows 15', 15". The active material 47 is deposited in the troughs 43, level with ribs 44, preferably by a pasting method involving the application of this material in charged or discharged state to the grid in the form of a paste. The paste consists of the electrochemically active compound admixed with water and, advantageously, a wetting agent. The use of the wetting agent insures proper wetting of the powder and reduces the amount of moisture necessary for forming a thixotropic mixture of the proper pasting consistency. By using the smallest possible amount of moisture, there is assured a minimum of shrinkage of the active material during the drying and/or forming operations which may be necessary to prepare the electrode in final active form. The electrochemically active material 47 may be of either positive or negative polarity and may be in either the charged or the uncharged state. Among the positive charged materials there may be mentioned silver oxide, silver peroxide, silver chloride, copper oxide, and lead peroxide. The uncharged materials may be the metals of the above compounds. Among the negative active materials which may be pasted upon the grids herein described there may be mentioned zinc, lead and cadmium, as well as their oxides.

It should be noted in connection with the embossed form of grid hereinabove described that the aligned ribs thereof form intercommunicating chambers 78 through which a cooling medium may be circulated during high-rate discharges. This particular structure is of special utility in batteries used as motive-power sources wherein the limiting factor of the discharge rates may be the heat generated within the electrodes by the electrochemical reaction.

Figure 7:
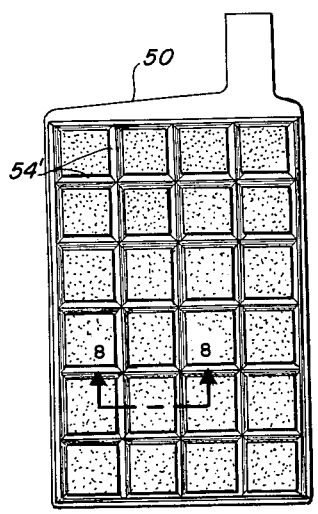
FIG. 7 shows another electrode utilizing the light-weight grid of this invention.
Figure 8:
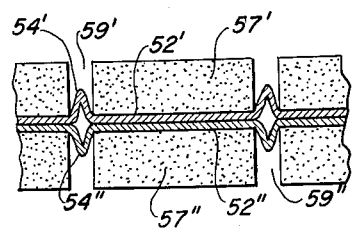
FIG. 8 is an enlarged section through the electrode of FIG. 7, taken on lines 8—8 thereof.

FIGS. 7 and 8 show a further modification in which an electrode 50 is formed with blocks 57', 57" of active material extending above the intersecting ribs 54', 54". In the manufacture of this electrode, the two grid halves 52', 52" may be sinter-bonded together at the same time as the active masses 57', 57" are subjected to a thermal fusion process which bonds their particles to one another and to the grid, thus resulting in a structure similar to that shown in FIGS. 7 and 8 of commonly assigned application Ser. No. 766,458, filed on even date herewith by Martin E. Kagan and Frank Solomon. The blocks 57' and 57" could, on the other hand, also be prefabricated, as by individual sintering, and then bonded onto their respective grid halves either before or after the latter are joined together.

The blocks 57', 57" form channels 59', 59" adapted to facilitate the circulation of electrolyte across the surface of the electrode.

It will be understood that the invention is not limited to either the particular structure described and illustrated or the specific materials mentioned above by way of example. It may be mentioned, in this connection, that the intersecting ribs of the novel grid herein disclosed may also be made by a cloisonné process involving the positioning of wires or the like on a sheet surface and a subsequent bonding of such wires to the sheet.

Although the presence of a supporting surface such as at least the ledge portions 16', 16" is desirable, it will be understood that it is also possible to omit or punch out completely the bottoms of the troughs formed between the intersecting ribs of the various types of grid described hereinabove. In such case the main advantage of the present structure is to be seen in the subdivision of the mass of active material into individual cells held together by a light but rigid supporting network of relatively thin intersecting ribs.

The pressing of the grid of the invention by means of a die, as described above, may also be performed on a previously perforated metal sheet whereby not only the bottoms of the troughs may be apertured, as illustrated at 25 in FIG. 3, but also the ribs framing these troughs. The presence of these additional perforations will generally not be objectionable, unless it is desired to circulate a cooling fluid incompatible with the electrolyte through the ribs, and will not materially weaken the electrode structure.

We claim:
1. An electrode for electrochemical batteries comprising an active material and a pair of conductive sheets each having intersecting ribs which rise from one side of the sheet and form troughs open toward the other side, said sheets being joined together back-to-back with the ribs in registry and with said troughs combined into internal imperforate cooling channels, said sheets being in conductive contact with one another, said active material being in the form of blocks lodged in the spaces framed by said ribs, said blocks projecting above said ribs with mutual separation along said ribs to a sufficient extent to provide a channel for circulation of electrolyte.

2. An electrode for electrochemical batteries comprising a conductive sheet having intersecting hollow imperforate cooling ribs and an active material in the form of blocks set in the spaces between said ribs, said blocks projecting above said ribs with mutual separation along said ribs to a sufficient extent to provide a channel for circulation of electrolyte.

References Cited in the file of this patent

UNITED STATES PATENTS

| | | |
|---|---|---|
| 266,262 | Shaw | Oct. 17, 1882 |
| 897,833 | Hubbell | Sept. 1, 1908 |
| 960,115 | Salom | May 31, 1910 |
| 1,325,710 | Carpenter | Dec. 23, 1919 |
| 2,527,888 | Milnes | Oct. 31, 1950 |
| 2,625,574 | Fuller | Jan. 13, 1953 |
| 2,654,794 | Zaugg | Oct. 6, 1953 |
| 2,677,006 | Ameln | Apr. 27, 1954 |
| 2,756,269 | Harrison et al. | July 24, 1956 |